Patented Feb. 6, 1945

2,369,084

UNITED STATES PATENT OFFICE 2,369,084

ULTRAVIOLET LIGHT FILTER COMPOUND

Frits E. Stockelbach, Verona, N. J., assignor to Fries Bros., Inc., New York, N. Y., a corporation of New Jersey No Drawing. Application April 4, 1944, Serial No. 529,507

1 Claim. (Cl. 260—474)

My present invention relates to a new chemical compound and to its application as a filter or chemical parasol for ultra-violet light rays having wave lengths between approximately 280 and 320 millimicrons. Although such ultra-violet light filter compound is capable of manifold applications in the arts, one of outstanding importance is that of protecting the exposed human skin against harmful sunburn and the effects of the ultra-violet rays present in flashes of large caliber guns upon firing.

In United States Patent No. 2,041,874 granted to me, there are disclosed the virtues and advantages of menthyl salicylate as a sunburn preventing means. The use of this compound in sunburn preventing compositions has met with marked commercial success. However, as menthol from which menthyl salicylate is formed is primarily a product of the Far East, it is now not only practically unobtainable due to war conditions, but it has also increased in cost about 1000%. This almost prohibitive cost of menthol gave rise for the need of a substitute for menthyl salicylate which would have comparable properties therewith as a chemical parasol for ultra-violet light and which could be sold at a low price. To this end I investigated the possibilities of other cyclic esters of salicylic acid which might be produced entirely from domestic basic materials which would be available in large quantities and at a relatively low price.

Menthol is structurally a substituted cyclohexanol, namely 1-methyl-4-isopropyl-cyclohexanol-(3), hence I first investigated the stereo isomers thereof, for example, the salicylic ester of symmetric menthol, 1-methyl-3-isopropyl-cyclohexanol-(5), to ascertain if it might prove a suitable substitute. I found, however, that while this stereo isomer could be produced synthetically from abundant available domestic materials, the yield was poor and the cost prohibitive. My further investigations led to the consideration of such available and cheap material which would be suitable for converting into a cyclic alcohol related to menthol. Such material I found in acetone which, on condensation with lime, is converted into a mixture of mesityl oxide and an unsaturated alicyclic ketone, 1-methyl-3-dimethyl-cyclohexenone-(5) which is readily separated from mesityl oxide and unconverted acetone by fractional distillation. This unsaturated ketone on hydrogenation under pressure and in the presence of a suitable catalyst, as, for instance, Raney's nickel catalyst, is readily reduced, first to the corresponding saturated ketone, 1-methyl-3-dimethyl-cyclohexanone-(5) which, on continued hydrogenation, is finally reduced to a secondary alicyclic alcohol, 1-methyl-3-dimethyl-cyclohexanol-(5). This latter compound, which it will be seen, is structurally closely related to the aforementioned symmetric menthol, is a crystalline body melting at 42° C. or almost at the same melting point as USP menthol and has the characteristic odor of menthol and camphor. With this alicyclic alcohol as a base I formed an ester with salicylic acid in the usual manner of forming such esters, which resulting ester, namely, 1 - methyl - 3 - dimethyl - cyclohexanyl - (5) salicylate is a colorless liquid having the following constants:

Boiling range, 4 mm _____ °C __  161–165
Refractive index, 20° C _____  1.516–1.518
Specific gravity, 25/25 _____  1.045–1.048
Optical rotation _____  0

This ester, so far as I am aware, has not been made before, is not mentioned in the literature, and constitutes a new chemical compound.

Comparative tests made with the 1-methyl-3-dimethyl-cyclohexanol-(5) and menthol USP to determine their respective effects on the skin of rabbits and to determine their relative toxicity on rats and guinea pigs showed that the two substances had substantially identical effects and toxicity.

Comparative tests were also made with the new ester 1-methyl-3-dimethyl-cyclohexanyl-(5) salicylate and menthyl salicylate to determine their transmission of ultra-violet light by placing each compound in a quartz cell 0.03 mm. thick and making measurements at prominent lines of the mercury spectrum utilizing a double quartz prism monochromator and a photocell and amplifier. These tests showed substantially complete screening of the rays having wave lengths between approximately 280 and 320 millimicrons and substantially complete transmission of rays having wave lengths above 365 millimicrons. In other words, I have established that 1-methyl-3-dimethyl-cyclohexanyl-(5) salicylate would satisfactorily replace the now unobtainable menthyl salicylate. I have also determined that the new compound can be manufactured and sold at a price comparable with that of menthyl salicylate prior to the war.

In use as a preventive for sunburn of the skin due to exposure to the sun or to flashes from high caliber guns upon firing, the 1-methyl-3-dimethyl-5-cyclohexanyl-(5) salicylate which, at ordinary temperature is a liquid, may be applied in either pure or diluted form directly to the skin before exposure, or it may be applied after being made up into a suitable lotion by solution in a suitable solvent such as alcohol, vegetable, animal or mineral oil, or as a cosmetic by admixture with suitable waxes and oils to form a cream of proper consistency. In whatever manner of application the compound is applied to the skin its effectiveness is primarily due to the film of the 1-methyl-3-dimethyl-cyclohexanyl-(5) salicylate which forms on the skin upon evaporation or absorption of the solvent, which film functions as an absorptive medium, screen or shield against penetration therethrough of rays having wave lengths between approximately 280 and 320 millimicrons. Although the proportion of the new salicylate in the lotion, cream or other vehicle may be relatively small, I have found that a cosmetic containing between approximately three and ten per cent. of the 1-methyl-3-dimethyl-cyclohexanyl-(5) salicylate possesses the anti-sunburning property to a marked degree.

Having now fully and completely described my invention and the manner in which it is to be used, I do not desire to be limited to any specific manner or mode of application of the 1-methyl-3-dimethyl-cyclohexanyl-(5) salicylate to the skin for the purposes described, and hence in the appended claim where I have used the term "vehicle" it is to be understood that such term comprises any solvent, oil, cream or other medium which serves as a carrier for the salicylate for facilitating its application to and deposition into the pores of the skin of the user. It will also be appreciated that the new salicylate hereinbefore described is not limited in its application to preventing sunburn but may also be used wherever an ultra-violet light filter is required for absorbing the rays having wave lengths between approximately 280 and 320 millimicrons.

What I claim is:

The compound 1-methyl-3 - dimethyl - cyclohexanyl-(5) salicylate having the following constants:

| | |
|---|---|
| Boiling range, 4 mm_____° C__ | 161–165 |
| Refractive index, 20° C_____ | 1.516–1.518 |
| Specific gravity, 25/25_____ | 1.045–1.048 |
| Optical rotation_____ | 0 |

FRITS E. STOCKELBACH.